United States Patent [19]
Dufrancatel

[11] 4,150,861
[45] Apr. 24, 1979

[54] ARTICLE OF FURNITURE FOR CAMPERS

[76] Inventor: Michel Dufrancatel, 380 Allee Clair-Bois, 76230 Bois-Guillaume, France

[21] Appl. No.: 798,837

[22] Filed: May 20, 1977

[30] Foreign Application Priority Data

May 21, 1976 [FR] France .................. 76 15347

[51] Int. Cl.² .......................................... A47B 49/00
[52] U.S. Cl. ................................. 312/266; 312/269; 312/271; 312/DIG. 33
[58] Field of Search ............... 312/266, 269, 271, 247, 312/314, 317, 318, DIG. 33; 296/23 R

[56] References Cited

U.S. PATENT DOCUMENTS

| | | | |
|---|---|---|---|
| 664,363 | 12/1900 | Upham | 312/269 |
| 806,277 | 12/1905 | McKee | 312/317 R |
| 1,084,744 | 1/1914 | Knapp | 312/266 |
| 1,145,264 | 7/1915 | Pflug | 312/266 |
| 2,206,225 | 7/1940 | Goodheart | 312/271 |
| 2,590,341 | 3/1952 | Nabholz | 312/266 |
| 2,886,394 | 5/1959 | Snyder | 312/271 |
| 3,347,591 | 10/1967 | Soroos et al. | 312/247 |
| 3,406,999 | 10/1968 | Kozicki | 312/266 |
| 3,857,623 | 12/1974 | Schneller | 312/266 |
| 3,880,345 | 4/1975 | Becker et al. | 312/271 |

*Primary Examiner*—Victor N. Sakran
*Attorney, Agent, or Firm*—Robert E. Burns; Emmanuel J. Lobato; Bruce L. Adams

[57] ABSTRACT

An article of furniture for campers having a stationary first storage cabinet movable from a first rest position forwardly of the first stationary cabinet to a second rest position on top of the stationary or first storage cabinet. A linkage system connects the two cabinets and has two symmetrical rigid levers pivotally mounted on opposite end sides of the stationary storage cabinet. Each lever has a longer arm and a second shorter arm therewith offset a given angle less than 90° from the longer arm thereof. The levers are pivotally mounted on respective opposite end sides of the movable storage cabinet at a position of junctions of the two arms of each lever. The pivotal connection is made in a plane in which the center of gravity of the movable storage cabinet is disposed. A lift bar for lifting the movable cabinet is secured to the lever arms so that the movable cabinet can be readily moved from one rest position to the other.

2 Claims, 13 Drawing Figures

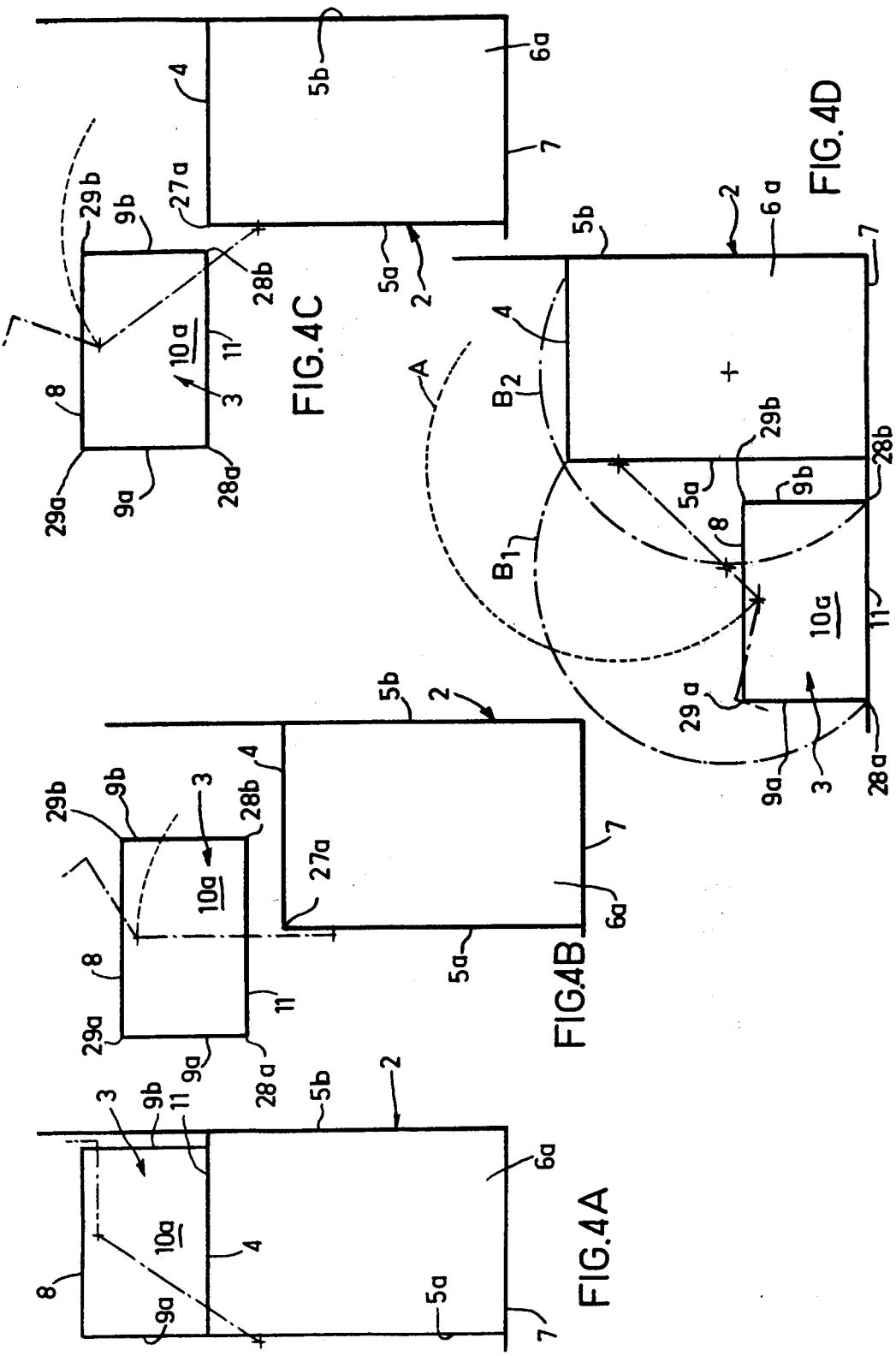

ARTICLE OF FURNITURE FOR CAMPERS

BACKGROUND OF THE INVENTION

This invention relates to convertible furniture consisting of a contrivance in two parts for the furnishing of a vehicle, in particular a camper.

Campers are already being equipped with furniture comprising a first, fixed part and a second, separate movable part which may be in a first, upper position in which it rests on the lower part or a second, lower position in which it is separated and disposed at the side thereof. The two parts are provided, respectively, with supplementary adjusting and stopping means for the movable part in its upper position and there are provided stopping means for the movable part in its lower position. This contrivance has disadvantages: the handling of the cumbersome, heavy movable part is difficult; putting it in its right place on the fixed part requires great care and caution; the stopping means are unattractive and in the way.

There are also known devices (see U.S. Pat. Nos. 3,857,623 and 3,406,999) for connecting furniture parts by means of deformable parallelograms. However, these means afford only limited free space for the movable part. They bear the weight of the movable part when in its lower position. It is not supported on the fixed part when in its upper position.

SUMMARY OF THE INVENTION

The object of the invention is to eliminate these disadvantages and, to this end, it proposes a contrivance wherein the connecting means are disposed in such a manner that, in its upper position, the movable part is supported on the fixed part and, in its lower position, it is supported on the floor in the immediate vicinity of the fixed part, while when moving between its two positions the movable part does not interfere with the fixed part and remains in its original relative position.

BRIEF DESCRIPTION OF THE DRAWINGS

The invention will be well understood when reading the following description which proceeds with reference to the accompanying drawings wherein:

FIGS. 4A, 4B, 4C and 4D are four diagrammatic side views of the contrivance shown in the FIGS. 1 to 3 in the various end and intermediary positions which the movable part may assume.

DESCRIPTION OF THE PREFERRED EMBODIMENTS

Figure 1:
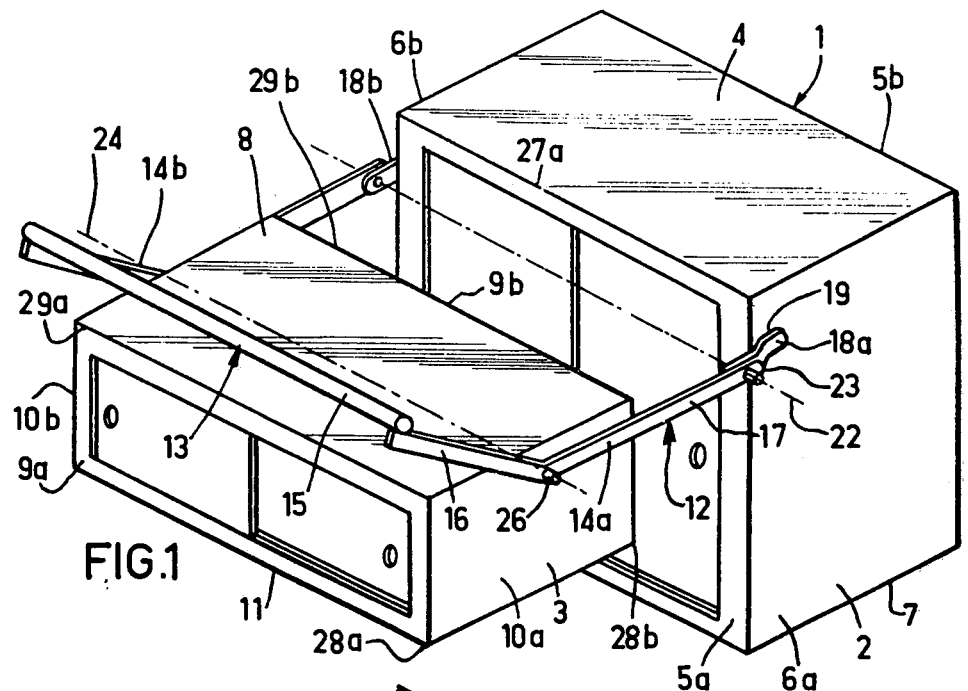
FIG. 1 is a perspective view of an embodiment of a contrivance according to the invention, in which the movable part is put in an intermediary position between its upper and lower position.
Figure 2:
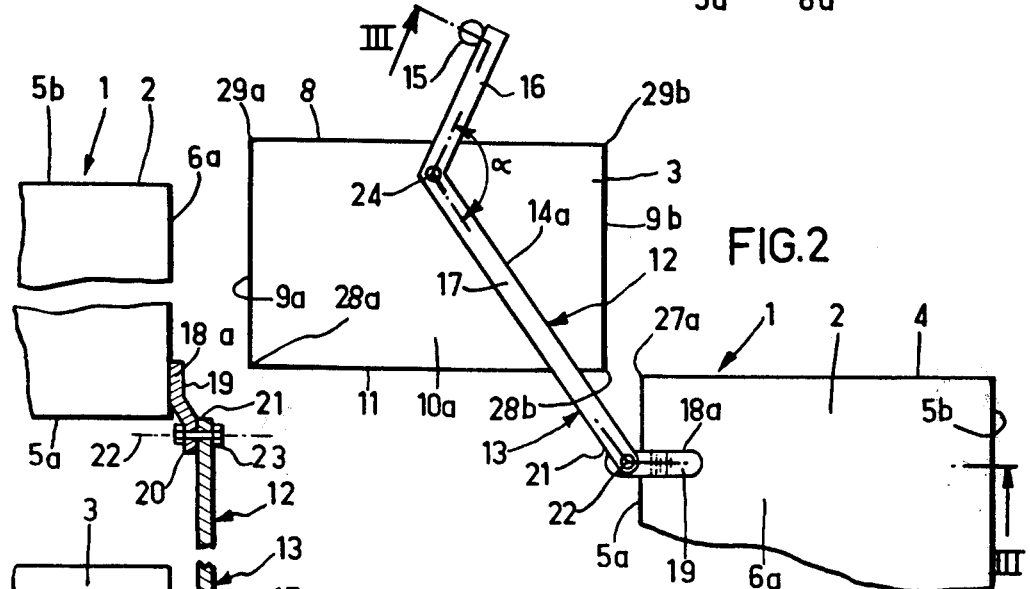
FIG. 2 is a fragmentary side view of the contrivance shown in FIG. 1.
Figure 3:
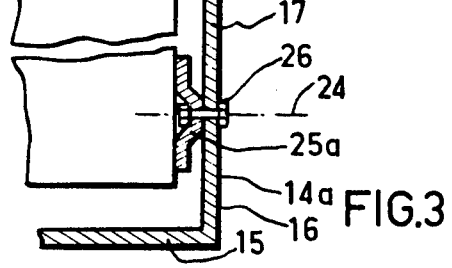
FIG. 3 is a fragmentary cross-sectional view taken on line III—III in FIG. 2.

The FIGS. 1 to 3 show a contrivance 1 which includes a first, fixed part 2 and a second, movable part 3 of the type forming a closet or the like which is used either in an upper position (FIG. 4A) in which it is supported on the fixed part 2, or in a retracted, lower position (FIG. 4D) in which it rests on the floor at the side thereof.

The fixed part 2 and the movable part 3 are defined by, respectively, a horizontal top face 4, 8, a vertical front face 5a, 9a, a vertical rear face 5b, 9b, two vertical side faces 6a, 6b, 10a, 10b, and a horizontal bottom face 7, 11.

Connecting means 12 interconnect the parts 2, 3 by means of a lever system in such a manner that the movable part 3 retains, during its movement, the same relative position in relation to the fixed part 2, in which the faces 8 and 11 are horizontal.

The means 12 comprise a rigid, substantially U-shaped frame 13 having two side arms 14a, 14b connected by a bar 15 perpendicular thereto and symmetrical with respect to the vertical plane P of symmetry of the contrivance, while being separated from each other by a distance which is at least equal to the distance between the side faces 6a, 6b, 10a, 10b.

The lever arm 14a comprises a first section 16 adjacent to the bar 15 and a second section 17 adjacent to the section 16 inclined with respect to the latter at an angle α and directed upwardly.

The fixed part 2 is provided with fastening and pivot members, for example, two identical legs 18a, 18b disposed in a substantially horizontal direction and attached to the faces 6a, 6b, respectively, and extending from the face 5a and symmetrically arranged with respect to the plane P. The leg 18a as a part 19 integral with face 6a and a part 20 parallel to and spaced from part 19.

The free end 21 of the section 17 of each lever arm 14a, 14b is linked to the corresponding leg 18a, 18b, about a single swivel axis 22 which is horizontal and crosswise perpendicular to the plane P, by means of swivel members 23 such as a pin, rivet, etc.

The movable part 3 is pivotally mounted to the lever arms 14a, 14b, about an axis 24 which is parallel to the axis 22 and located in the area where the two lever arm sections 16, 17 are connected by the fastening means 25a, 25b to each of the faces 10a, 10b, such as legs and pivot members 26. The fastening means 25a, 25b are disposed on the second part 3 in such a manner that the center of gravity of the latter is located in substantially the vertical plane containing the axis 24 and thereunder.

The numeral 27a indicates the upper front edge between the faces 4 and 5a; 28a and 28b indicate, respectively, the lower front and rear edges, and 29a and 29b the upper front and rear edges of the movable part 3.

The position of the axis 22 relative to the fixed part 2, the position of the axis 24 in the movable part 3, the lengths of the lever arm sections 16, 17 and the angle α are such that the movable part 3 can be displaced without interfering with the fixed part 2.

In its upper position (FIG. 4A), the movable part 3 rests on the fixed part 2, the two faces 11 and 4 being in close contact with each other. The two lever arm sections 16 are disposed substantially horizontally and towards the back. The bar 15 is in a downward position above the movable part 3 which may be made smaller (FIG. 4A) so as to provide a clearance.

In its lower position (FIG. 4D), the second part 3 rests on the floor in the immediate vicinity of the first part 2; the connecting bar 15 is then disposed in the vicinity of edge 29a.

Passing from the upper position to the lower position proceeds as follows: the user pulls the bar 15, a first function of which is that of handle bar, in his direction, which causes the frame 13 to pivot about the axis 22; this brings about the simultaneous displacement of the movable part 3 which retains its initial relative position. FIG. 4B shows the second, movable part 3 at its highest point when the lever arm sections 17 are vertical. The axis 22 being located in front of face 5a, the movable part 3 does not interfere with the fixed part 2. In FIG. 4, the movable part 3 is at the same horizontal level as in the upper position (FIG. 4A). However, face 9b has been shifted forwards with respect to face 5a.

In FIG. 4D, the curves A B1 and B2 represent the paths of the axis 24 and the edges 28a and 28b. Part 3 can be kept horizontal on account of the presence of the bar 15 which is integral with the lever arms 14a and 14b. Moreover, frame 13 forms a third kind lever which facilitates the movement considerably.

The FIGS. 5A, 5B, 5C and 5D show a contrivance 40 wherein the connecting means 12 comprise two connecting rods 41 located on either side of the contrivance and each having two sections 42, 43 which are rigidly connected, said rods being linked to the movable part 3 about an axis 44 as in the case of axis 24 and at their lower end about a common axis 45 which is parallel to the axis 44, disposed so as to be capable of sliding in relation to the fixed part 2 in a horizontal plane in a direction which is perpendicular to the axis 45 thanks to sliding means 46 which may involve, for example, two pairs located on either side of the contrivance and each comprising a first, horizontally directed slide 47 fixed to each face 6a, 6b, in the vicinity of face 7, a second slide 48 guided by and slidingly mounted in slide 47 by any suitable means such as a roller, etc., and a third slide 49 guided by and slidingly mounted in slide 48 by any suitable means. The axis 45 is located in the vicinity of the rear end of slide 49. The sliding means 46 can telescope between a retracted position (FIGS. 5A, 5D) in which the axis 45 is located in the vicinity of face 5b and an extended position (FIGS. 5B and 5C) in which it is located in front of face 5a.

Figure 5A:
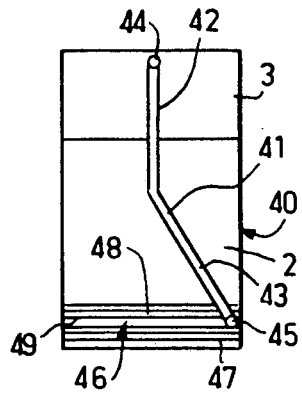
FIGS. 5A, 5B, 5C, 5D are four diagrammatic side views of another embodiment of a contrivance according to the invention in the various end and intermediary positions which the movable part may assume.
Figure 5B:
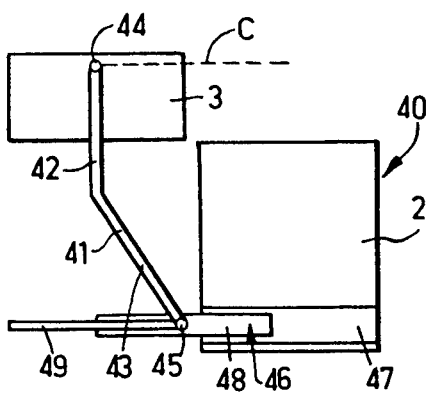
Figure 5C:
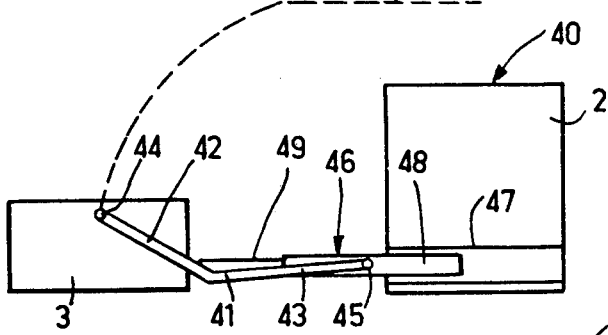
Figure 5D:
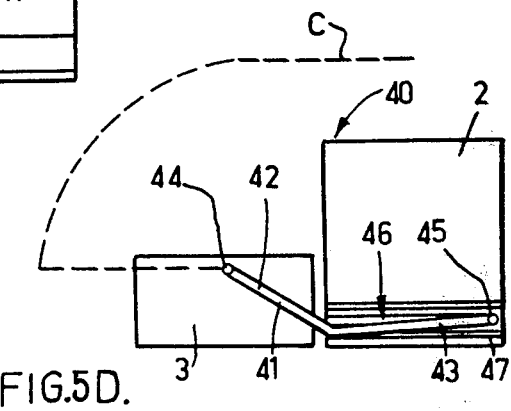

Part 3 passes from its upper position to its lower position in the following manner: the means 46 are put into their extended position (FIG. 5B) which brings about a horizontal displacement of the movable part 3, and, while the means 46 remain extended, the rods 41 are made to turn about the axis 45; the movable part 3 retains substantially its original relative position (FIG. 5C). It is possible to retract the means 46 so as to effect a horizontal displacement of the second part 3 in the direction of the first part 2 until these two parts are in close proximity of one another (FIG. 5D). Thus, the axis 44 has traveled along the curve C which comprises two horizontal, rectilinear sections interconnected by an arcuate section.

Figure 6:
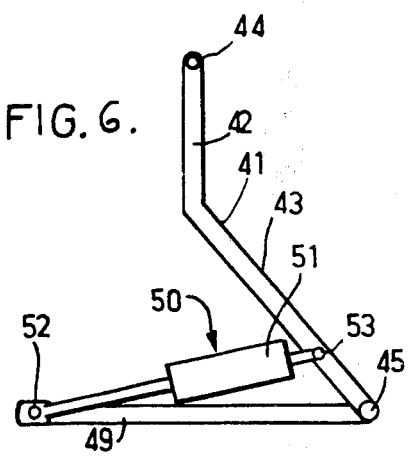
FIG. 6 is a detail drawing of a component of a contrivance according to the invention.

According to a modified form (FIG. 6) the contrivance 40 includes auxiliary means 50 which urge the rods towards the position which they assume when the second part 3 is in its upper position and which comprise a jack 51 linked on one side to the slide 49 about an axis 52 located in the vicinity of its front end and, on the other side, to the rod section 43 about an axis 53 in the vicinity of the axis 45.

Figure 7:
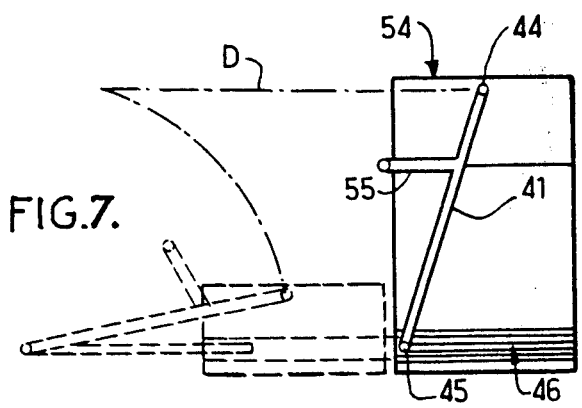
FIG. 7 is diagrammatic side view of still another form of a contrivance according to the invention.

FIG. 7 shows a contrivance 54 which is a modified form of the contrivance 40, the axis 45 being located therein in the vicinity of face 5a when the second part 3 is in its upper position. The extension of the means 46 is then larger than before and the path of the axis 44 is a curve D which comprises a horizontal section and an arcuate section. The two rods 41 can be rigidly joined together by a frame 55, located between the two axes 44 and 45, which on the one hand forms a grip and on the other a reinforcing means.

The two modified embodiments may be provided with stopping means which limit the pivoting movement of the rods 41 about the axis 45.

I claim:

1. An article of furniture for campers, a stationary first storage cabinet, a movable second storage cabinet swingable from a first rest position forwardly of the front cabinet and resting on a same surface on which the first cabinet rests to a second rest position in which the second cabinet rests on top of the first cabinet, a linkage system connecting the first and the second storage cabinets comprising two symmetrical, rigid levers, pivot means pivotally mounting the two rigid levers symmetrically on opposite end sides of the first storage cabinet on a common first pivot axis with the two levers extending forwardly and swingable about said first pivot axis, each lever having a longer arm and a second shorter arm integral with the first arm offset therefrom upwardly a given angle less than ninety degrees, second pivot means pivotally mounting symmetrically the two levers on respective opposite end sides of the second storage cabinet, each second pivot means pivotally mounting the two levers on a common second pivot axis at a juncture of each of the two arms thereof, said second pivot axis being disposed in a plane in which the center of gravity of said second storage cabinet is disposed, said first and second pivot axes being disposed in spaced parallel planes, and a rigid lift bar connecting the two offset arms of said levers above the level of the second storage cabinet, for lifting storage cabinet between the first and second rest positions thereof.

2. An article of furniture for campers according to claim 7, in which said first pivot means allows the pivot thereon and said levers to be moved forwardly and rearwardly relative to the stationary first storage cabinet.

* * * * *